United States Patent [19]

Malinow

[11] Patent Number: 5,046,904
[45] Date of Patent: Sep. 10, 1991

[54] NUT FOR MOUNTING TRIM TO A MOTOR VEHICLE

[75] Inventor: Ivanna G. Malinow, Troy, Mich.

[73] Assignee: General Motors Corporation, Detroit, Mich.

[21] Appl. No.: 566,687

[22] Filed: Aug. 13, 1990

[51] Int. Cl.⁵ .............................................. F16B 13/04
[52] U.S. Cl. ....................................... 411/15; 411/182
[58] Field of Search ................... 411/55, 60, 182, 510, 411/508, 15, 427, 908, 913, 44

[56] References Cited

U.S. PATENT DOCUMENTS

| | | | |
|---|---|---|---|
| 2,943,373 | 7/1960 | Rapata | 411/913 X |
| 3,272,952 | 9/1966 | McKeon | 411/913 X |
| 3,363,381 | 1/1968 | Forrest | 411/55 X |
| 3,386,757 | 6/1968 | Forward | 411/182 X |
| 4,270,328 | 6/1981 | Page et al. | 52/511 |
| 4,293,260 | 10/1981 | Kojima et al. | 411/44 |
| 4,356,592 | 11/1982 | Moore | 16/125 |
| 4,357,734 | 11/1982 | Moore | 16/125 |
| 4,461,593 | 7/1984 | Rodseth | 403/11 |
| 4,579,492 | 4/1986 | Kazino et al. | 411/182 X |

FOREIGN PATENT DOCUMENTS

| | | | |
|---|---|---|---|
| 2813749 | 10/1978 | Fed. Rep. of Germany | 411/182 |
| 3038341 | 6/1982 | Fed. Rep. of Germany | 411/55 |
| 2277263 | 1/1976 | France | 411/15 |
| 888450 | 1/1962 | United Kingdom | 411/182 |

OTHER PUBLICATIONS

Docket No. P-2530/89; Fisher Body Production Drawing 20310739.
Nut-Front Door Armrest; Fisher Body Production Drawing 20485761, Nut-Door Pull Strap.

Primary Examiner—Rodney M. Lindsey
Attorney, Agent, or Firm—Raymond I. Bruttomesso, Jr.

[57] ABSTRACT

A one-piece molded plastic nut for receiving a screw adapted to retain a trim assembly to a panel having a slot. The plastic nut has a head having a bottom surface and a top surface with a trench molded into the head and opening onto the top surface. The trench has a bottom face with three holes molded in the bottom face of the trench that extend through to the bottom surface of the head with the holes adapted to receive the screw. The trench has a pair of opposing facing planar side walls and a pair of opposing facing planar end walls angled towards the bottom face for guiding the screw towards one of the holes in the bottom face. Two flexible webs are spaced between the holes and conform to and engage the screw when inserted into one of the holes. A pair of legs mirror each other and are adapted for insertion into the slot for engaging the panel and retaining the plastic nut to the panel. Each leg has an inner surface having a series of molded curved surfaces aligned with the holes in the head. These curved surfaces allow the screw to extend between the legs creating an interference fit with the legs, retaining the legs against the panel adjacent to the slot whereby the trim assembly is secured to the panel by the screw which is guided into one of the holes by the planar walls.

5 Claims, 2 Drawing Sheets

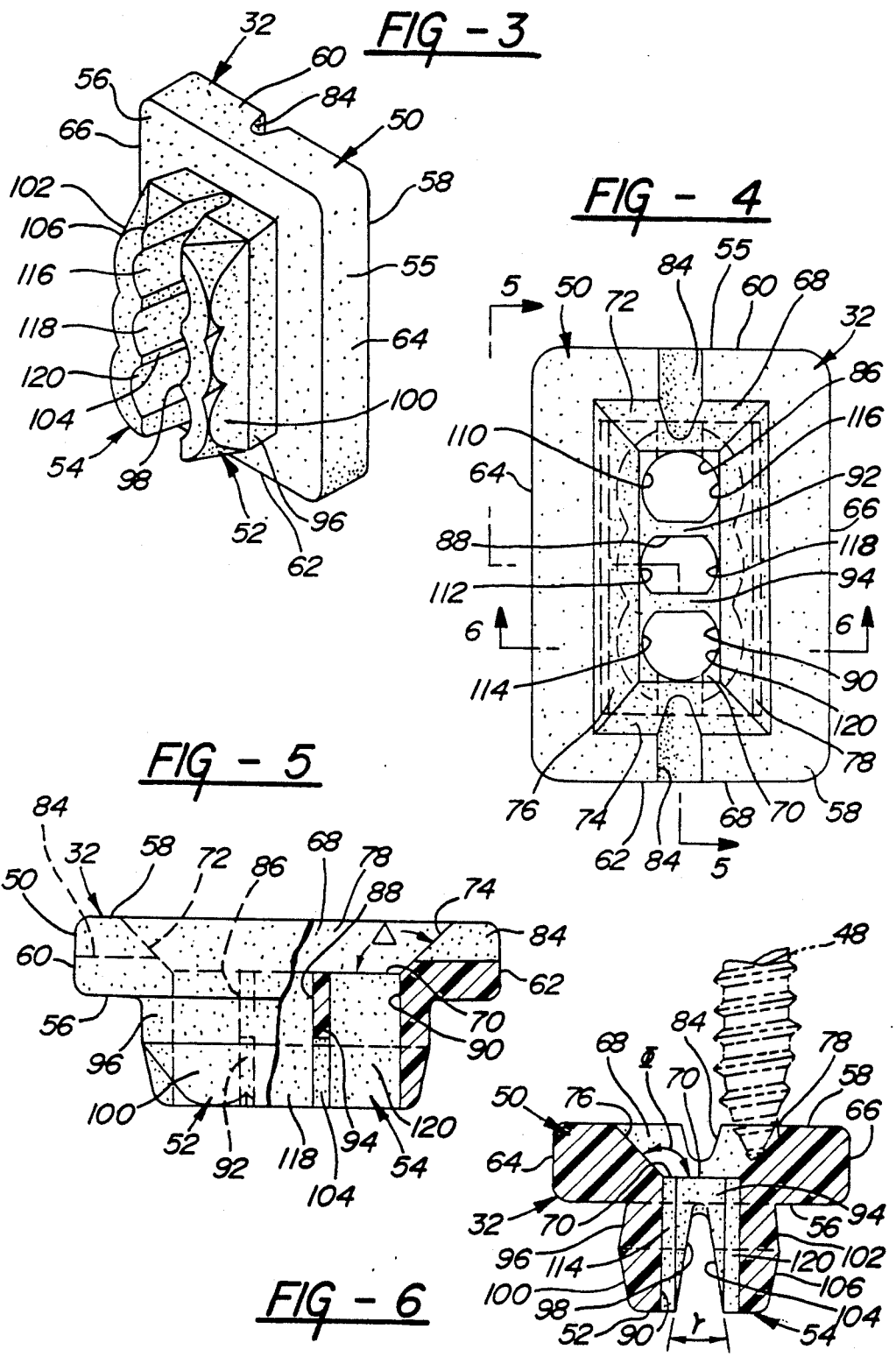

NUT FOR MOUNTING TRIM TO A MOTOR VEHICLE

The invention relates to a nut and more particularly to a plastic nut for mounting trim to a motor vehicle with the plastic nut guiding a blindly driven screw to the proper portion of the nut for acceptance of the screw thereby securing the trim to the motor vehicle.

BACKGROUND OF THE INVENTION

It is known to mount the trim to a motor vehicle by driving a screw into a hole in a plastic nut mounted in the vehicle structure.

It is also known to have a chamfer edge on the hole in the plastic nut in order to break the sharp edges and help align the screw as it enters the hole. However, the area in which the screw can hit initially on the plastic nut and be guided to the hole is severally limited.

It would be desirable to provide a plastic nut which allows for mounting the trim with a blindly driven screw, where the plastic nut can direct the screw to one of a series of holes, when the screw first engages any portion of a planar trench.

SUMMARY OF THE INVENTION

This invention provides a one-piece molded plastic nut for receiving a screw adapted to retain a trim assembly to a panel having a slot. The plastic nut has a head having a bottom surface and a top surface with a trench molded into the head and opening onto the top surface. The trench has a bottom face with three holes molded in the bottom face of the trench that extend through to the bottom surface of the head with the holes adapted to receive the screw. The trench has a pair of opposing facing planar side walls and a pair of opposing facing planar end walls angled towards the bottom face for guiding the screw towards one of the holes in the bottom face. Two flexible webs are spaced between the holes and conform to and engage the screw when inserted into one of the holes. A groove is molded symmetrically into the top surface of the head in the same plane as the three holes and adapted to allow the plastic nut to flex about a plane that passes through the groove as the plastic nut engages the panel. A pair of legs mirror each other and angle away from each other as the legs project from the head and are adapted for insertion into the slot for engaging the panel and retaining the plastic nut to the panel. Each leg has an inner surface that faces the inner surface of the other leg, with the inner surface having a series of molded curved surfaces aligned with the holes in the head. These curved surfaces allow the screw to extend between the legs creating an interference fit with the legs, retaining the legs against the panel adjacent to the slot whereby the trim assembly is secured to the panel by the screw which is guided into one of the holes by the planar walls.

One object, feature and advantage of this invention is a plastic nut having a head with a trench molded into the head, with the trench having a bottom face with a plurality of holes and the trench having a pair of opposing facing planar side walls and a pair of opposing facing planar end walls angled towards the bottom face for guiding a screw towards one of the holes in the bottom face.

Further objects, features and advantages of the present invention will become apparent to those skilled in the art as the nature of the invention is better understood from the accompanying drawings and detailed description.

BRIEF DESCRIPTION OF THE DRAWINGS

FIG. 3 is a perspective view of the plastic nut.

FIG. 4 is an elevation view of the plastic nut.

FIG. 5 is a sectional view of the plastic nut taken in the direction of arrows 5—5 of FIG. 4.

FIG. 6 is a sectional view of the plastic nut taken in the direction of arrows 6—6 of FIG. 4.

DESCRIPTION OF THE PREFERRED EMBODIMENT

Figure 1:
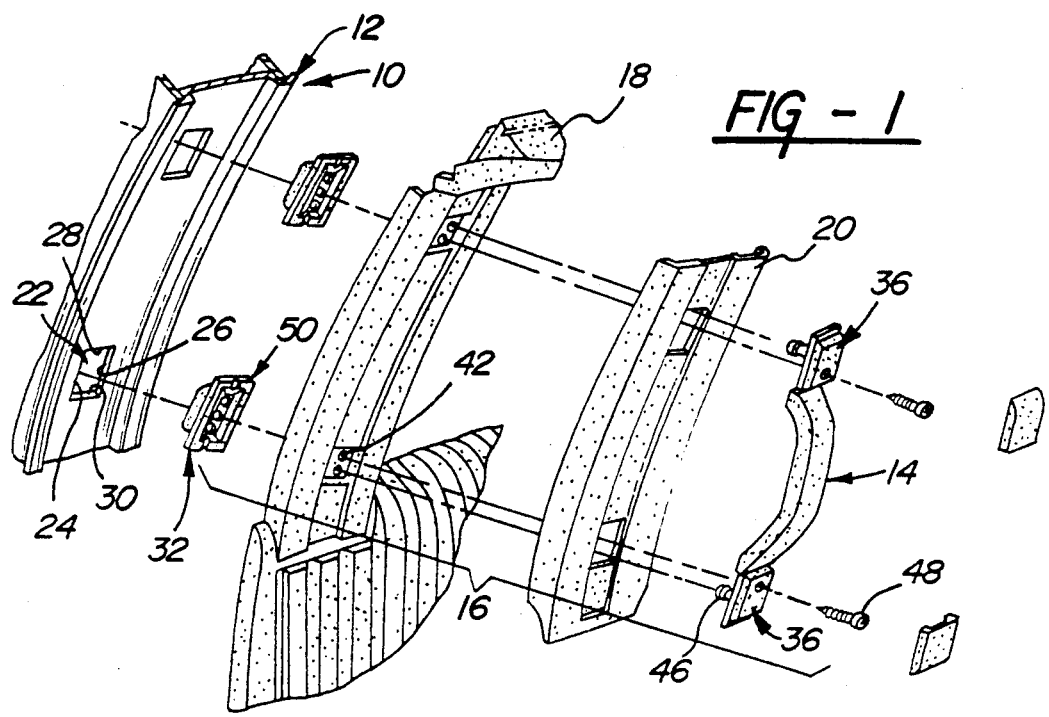
FIG. 1 is an exploded perspective view showing the relation of the plastic nut to the motor vehicle and the trim assembly.

A motor vehicle body 10 has a pillar or panel 12 on which a passenger assist strap 14 is mounted using a fastening system shown generally at 16 as seen in FIG. 1, which at the same time secures a trim assembly 18 and an upper trim assembly 20. The pillar 12 has a rectangular slot 22 having a pair of long walls 24 and 26 and a pair of shorter short walls 28 and 30 for receiving a molded plastic nut 32 from an inboard direction of the pillar 12 as seen in FIG. 1.

Figure 2:
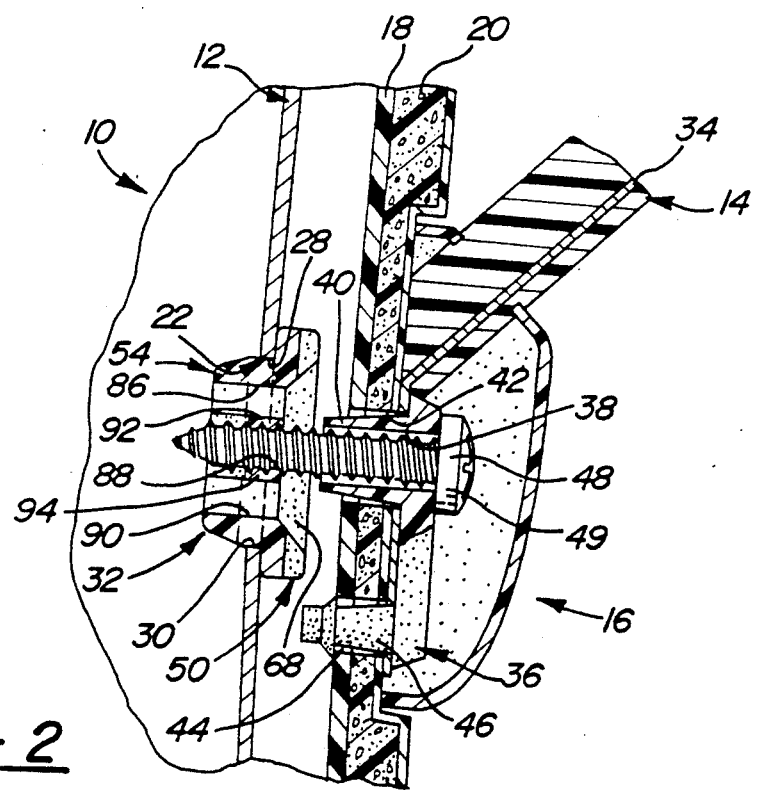
FIG. 2 is an elevation view of the passenger assist strap mounted to the pillar.

Referring to FIG. 2, the passenger assist strap 14 has a metal strap portion 34 which anchors at each end to an anti-rotation mounting plate 36. A screw 48, for example a 6.3-1.81 screw, extends through a hole 38 located in a projection 40 in the anti-rotation mounting plate 36 securing the passenger assist strap 14 to the plastic nut 32 and the vehicle body 10. The trim assembly 18 has a first aperture 42 through which the projection 40 passes through a second aperture 44 to engage an anti-rotation tap 46 of the anti-rotation mounting plate 36 to prevent the passenger assist strap 14 from rotating.

Referring to FIGS. 3 through 6, the plastic nut 32 is generally a "T" shape having a head portion 50 and a pair of legs 52 and 54 that protrude from the head portion 50 and are received by the slot 22 in the pillar 12. The plastic nut 32 is preferably molded in one piece from suitable material such as Nylon 6, for example, Allied Capron 8202. Referring to FIG. 3, the head 50 is generally a rectangular box shape 55 having a bottom surface 56 where the legs 52 and 54 protrude from the head 50 and which rest on the face of the pillar 12 when the plastic nut 32 is installed in the rectangular slot 22 as seen in FIG. 2. A top surface 58 of the plastic nut 32 is on the opposite side from the bottom surface 56 as seen in FIG. 5. A pair of short side surfaces 60 and 62 and a pair of longer long side surfaces 64 and 66 spans between the top surface 58 and the bottom surface 56.

Referring to FIGS. 5 and 6, a trench 68 molded into the head 50 of plastic nut 32 opens onto the top surface 58. The trench 68 has a flat bottom face 70 and four planar walls 72, 74, 76 and 78 that extend from the top surface 58 to the bottom face 70. The short planar walls 72 and 74 intersect the bottom face 70 at an angle $\Delta$ of approximately 135° and the long planar walls 76 and 78 intersect the bottom face 70 at an angle $\Phi$ of approximately 135° as seen in FIGS. 5 and 6. A groove 84, which is not as deep as the trench 68, is symmetrical molded on top surface 58 and runs from one of the short side surfaces 60 to the other short side surface 62 in the portion where the trench 68 is not molded as seen in FIGS. 4 and 5.

Referring to FIGS. 4 and 5, a triplet of holes 86, 88 and 90 are molded in the flat bottom face 70 of the plastic nut 32. The holes 86, 88 and 90 are centrally located, symmetrical between long planar walls 76 and 78 and preferably equally spaced between the short planar walls 72 and 74. The holes 86, 88 and 90 have a general circular shape and would intersect each other slightly, if not for a pair of flexible webs 92 and 94 projecting between the holes 86, 88 and 90.

Referring to FIGS. 3 and 6, the legs 52 and 54 are identical and mirror each other. As seen in FIG. 6, the legs 52 and 54 angle outward from the head 50 from a combined outside dimension just slightly smaller than the short walls 28 and 30 of the rectangular slot 22 in the pillar 12 to a dimension just slightly larger than the short walls 28 and 30 of the rectangular slot 22. Referring to FIGS. 6 and 3, an outer surface 96 of the leg 52 has a taper surface 100 which tapers back inward. The other leg 54 also has an outer surface 102 and a taper surface 106, since the plastic nut 32 is symmetrical about a plane that is parallel to the long side surfaces 64 and 66 and passes through the groove 84. The taper makes the edge dimension smaller than the short walls 28 and 30 of the rectangular slot 22, thus making it easier to align and install the plastic nut in the rectangular slot 22 in the pillar 12 as described below. The legs 52 and 54 angle away from each other, with an inner surface 98 of the leg 52 projecting from the bottom surface 56 of the head 50 to create an angle Γ of approximately 16° with an inner surface 104 of the other leg 54.

Referring to FIGS. 3 and 4, a triplet of curved surfaces 110, 112, and 114 are molded on the inner surface 98 of the leg 52 and align with the three holes 86, 88 and 90 in the head 50, where the leg 52 would otherwise project underneath the holes 86, 88 and 90. A triplet of curved surfaces 116, 118, and 120 on the other leg 54 mirror the curved surfaces 110, 112, and 114 on the leg 52. The flexible webs 92 and 94 extend down from the head portion 50 of the plastic nut 32 between the legs 52 and 54 and are molded to conform generally with the inner surfaces 98 and 104 of the legs 52 and 54.

Referring to FIG. 1, the passenger assist strap 14 and the trim assemblies 18 and 20 are securely fixed in the motor vehicle 10 as the vehicle 10 moves down the assembly line by first installing the plastic nut 32 in the rectangular slot 22 in the pillar 12. Referring to FIGS. 1 and 3, installation of the plastic nut 32 is accomplished by first placing the taper surfaces 100 and 106 of the legs 52 and 54 of the plastic nut 32 against the long walls 24 and 26 of the rectangular slot 22. The plastic nut 32 is forced by the operator towards the pillar 12 flexing the legs 52 and 54 inward, toward each other, as the taper surfaces 100 and 106 slideably engage the long walls 24 and 26 of the rectangular slot 22. Thus, the portion of the legs 52 and 54 which is slightly larger than the short walls 28 and 30 of the rectangular slot 22 move towards each other, as legs 52 and 54 pass through the rectangular slot 22. The groove 84 on the head portion 50 of the nut 32 allows the plastic nut 32 to flex with greater ease and less chance of structural cracking Once the portion of the legs 52 and 54 that is larger than the short walls 28 and 30 of the slot 22 passes through the slot 22, the plastic nut 32 returns to an un-flexed or normal position as the bottom surface 56 of the head 50 engages the pillar 12.

Referring to FIG. 1, the trim assembly 18, the upper trim assembly 20 and the passenger assist strap 14 are placed in the motor vehicle 10. The screw 48 is placed into the hole 38 in the projection 40 in the anti-rotation mounting plate 36 and is blindly forced towards the plastic nut 32 as seen in FIG. 2. If the screw 48 hits one of the long planar walls 76 and 78 as shown in Phantom in FIG. 6, as it is blindly driven through the hole 38 in the projection 40, the screw 48 will be guided down the planar wall towards the flat bottom face 70 of the trench 68 as pressure is asserted on the screw 48 towards the plastic nut 32. Referring to FIG. 2, the projection 40 of the anti-rotation mounting plate 36 shifts with the screw 48 to allow this movement towards the flat bottom face 70.

Referring to FIGS. 4 and 2, the plastic nut 32 will move up and down in the rectangular slot 22 allowing the screw 48 to enter one of the holes 86, 88 and 90. The flexible webs 92 and 94 that separate the holes 86, 88 and 90 flex and conform to the screw 48 as the screw 48 is driven into the nut 32. The screw 48 is driven until a head 49 of the screw 48 engages the anti-rotation mounting plate 36. The screw 48 is of such a length that when it is driven completely in, the screw 48 extends into the space between the legs 52 and 54 and forms an interference fit thereby preventing the plastic nut 32 from flexing. Thus, the plastic nut 32 is not capable of being removed from the slot 22 because the legs 52 and 54 are not able to move together and securely engage the long walls 24 and 26 of the rectangular slot 22. The plastic nut 32 and screw 48 are securely attached to the pillar 12 of the motor vehicle 10.

While one embodiment of the present invention has been explained, various modifications within the spirit and scope of the following claims will be readily apparent to those skilled in the art.

What is claimed is:

1. A one-piece molded plastic nut for receiving a screw adapted to retain a trim assembly to a panel having a slot, the plastic nut comprising:

a head having a bottom surface and a top surface with a trench molded into the head and opening onto the top surface, and the trench having a bottom face with a plurality of holes molded in the bottom face of the trench and extending through to the bottom surface of the head for receiving the screw and the trench having a pair of opposing facing planar side walls and a pair of opposing facing planar end walls angled towards the bottom face for guiding the screw towards one of the holes in the bottom face; and a pair of legs adapted for insertion into the slot in the panel for engaging the panel and retaining the plastic nut to the panel and securely engaging the slot after the screw passes through one of the holes in the head and the screw forms an interference fit between the legs thereby retaining the legs against the panel adjacent to the slot whereby the trim assembly is secured to the panel by the screw which is guided into one of the holes by the planar walls.

2. A plastic nut as in claim 1 wherein:

the planar walls of the trench intersect the bottom face at an angle between 120° and 160°.

3. A one-piece molded plastic nut for receiving a screw adapted to retain a trim assembly to a panel having a slot, the plastic nut comprising:

a head having a bottom surface and a top surface with a trench molded into the head and opening onto the top surface, and the trench having a bottom face with a plurality of holes molded in the bottom face of the trench and extending through to the bottom surface of the head for receiving the screw and the trench having a pair of opposing facing planar side walls and a pair of opposing facing planar end walls angled towards the bottom face for guiding the screw towards one of the holes in the bottom face, and a plurality of flexible webs spaced between the holes and being engaged and flexed and conforming to the screw when the screw when inserted and a groove molded symmetrically into the top surface of the head in the same plane as the plurality of holes and adapted to allow the plastic nut to flex about a plane that passes through the groove as the plastic nut engages the panel; and a pair of legs mirroring each other and projecting angularly away from each other as the legs project from the head and the legs are adapted for insertion into the slot for engaging the panel and retaining the plastic nut to the panel, and each leg having an inner surface that faces the inner surface of the other leg with the inner surface having a series of molded curved surfaces aligned with the holes in the head for allowing the screw to extend between the legs creating an interference fit with the legs retaining the legs against the panel adjacent to the slot whereby the trim assembly is secured to the panel by the screw which is guided into one of the holes by the planar walls.

4. A plastic nut as in claim 3 wherein:

the planar walls of the trench intersect the bottom face at an angle between 120° and 160°.

5. A plastic nut as in claim 4 wherein:

the inner surfaces of the legs define a pair of planes which intersect at an angle between 15° and 20°.

* * * * *

UNITED STATES PATENT AND TRADEMARK OFFICE
CERTIFICATE OF CORRECTION

PATENT NO. : 5,046,904

DATED : September 10, 1991

INVENTOR(S) : Ivanna G. Malinow, Troy; Ronald W. Huber, Fraser, both of Michigan It is certified that error appears in the above-identified patent and that said Letters Patent is hereby corrected as shown below:

Title page, column 1, list of inventors, after "Troy", insert -- Ronald W. Huber, Fraser, both of --.

Signed and Sealed this

Sixth Day of April, 1993

Attest:

STEPHEN G. KUNIN

Attesting Officer

Acting Commissioner of Patents and Trademarks